US008479631B2

(12) United States Patent
Ehmig et al.

(10) Patent No.: US 8,479,631 B2
(45) Date of Patent: Jul. 9, 2013

(54) PROPELLANT HOLDER FOR AN EXPLOSION-DRIVEN SETTING TOOL AND AN EXPLOSION-DRIVEN SETTING TOOL

(75) Inventors: Gerhard Ehmig, Rankweil (AT); Tilo Dittrich, Gams (CH)

(73) Assignee: Hilti Aktiengesellschaft, Schaan (LI)

( * ) Notice: Subject to any disclaimer, the term of this patent is extended or adjusted under 35 U.S.C. 154(b) by 1439 days.

(21) Appl. No.: 11/967,062

(22) Filed: Dec. 29, 2007

(65) Prior Publication Data

US 2008/0156843 A1 Jul. 3, 2008

Related U.S. Application Data

(63) Continuation of application No. 10/830,167, filed on Apr. 22, 2004, now abandoned.

(30) Foreign Application Priority Data

May 2, 2003 (DE) ................................. 103 19 646

(51) Int. Cl.
*B64D 1/04* (2006.01)

(52) U.S. Cl.
USPC ............. 89/1.14; 89/33.14; 89/33.2; 89/33.1; 42/1.01; 102/531; 102/204; 102/281; 102/530; 227/10; 227/135; 227/136; 227/9; 227/8

(58) Field of Classification Search
USPC 89/1.14, 33.14, 33.2, 33.1; 42/1.01; 102/531, 102/204, 281, 530; 227/10, 135, 136, 9, 8
See application file for complete search history.

(56) References Cited

U.S. PATENT DOCUMENTS

| | | | | |
|---|---|---|---|---|
| 3,558,007 | A | | 1/1971 | Seghezzi |
| 3,756,118 | A | | 9/1973 | Ratz |
| 4,063,672 | A | | 12/1977 | Jochum |
| 4,091,730 | A | | 5/1978 | Dardick |
| 4,204,473 | A | | 5/1980 | Dardick |
| 4,382,533 | A | | 5/1983 | Buechel |
| 4,858,811 | A | | 8/1989 | Brosius |
| 5,177,318 | A | | 1/1993 | Martinez |
| 5,206,444 | A | | 4/1993 | Oliver |
| 5,208,420 | A | | 5/1993 | Hamilton |
| 5,661,887 | A | | 9/1997 | Byrne |
| 5,666,710 | A | | 9/1997 | Weber |
| 5,771,021 | A | * | 6/1998 | Veghte et al. .......... 343/700 MS |
| 5,794,831 | A | | 8/1998 | Velan |
| 5,799,432 | A | | 9/1998 | Wright |

(Continued)

FOREIGN PATENT DOCUMENTS

| | | | |
|---|---|---|---|
| DE | 19746018 | A1 | 4/1999 |
| EP | 0942161 | A2 | 9/1999 |
| EP | 1156266 | A2 | 11/2001 |

*Primary Examiner* — J. Woodrow Eldred
(74) *Attorney, Agent, or Firm* — Abelman, Frayne & Schwab

(57) ABSTRACT

An explosion-driven setting tool includes a setting mechanism (12) driven by a propellant (23), an ignition unit (18) for igniting the propellant (23), a receptacle (15) for receiving a propellant holder (20), a data communication interface (31) for receiving and transmitting data of the propellant holder (20), and a data processing unit (30) for receiving data transmitted by the data communication interface (31) and connected with a display (50) for displaying the propellant supply level (27) of the propellant (23) in the propellant holder having a housing (21) with an interior space (22) for receiving the propellant (23), and a data storage identification unit (40) in which the propellant supply level (27) is stored for being read-out.

4 Claims, 6 Drawing Sheets

U.S. PATENT DOCUMENTS

| | | | |
|---|---|---|---|
| 5,811,717 | A | 9/1998 | Day |
| 5,826,360 | A | 10/1998 | Herold |
| 5,889,211 | A | 3/1999 | Maudie |
| 6,053,108 | A | 4/2000 | Remerowski |
| 6,057,012 | A | 5/2000 | Culp |
| 6,062,455 | A | 5/2000 | Giannuzzi |
| 6,123,068 | A | 9/2000 | Lloyd |
| 6,123,241 | A | 9/2000 | Walter |
| 6,213,370 | B1 | 4/2001 | Walter |
| 6,223,963 | B1 | 5/2001 | Aparacio |
| 6,247,626 | B1 * | 6/2001 | MacVicar ....................... 227/10 |
| 6,276,253 | B1 | 8/2001 | Sprenger |
| 6,311,887 | B1 | 11/2001 | Walter |
| 6,318,615 | B1 | 11/2001 | Walter |
| 6,336,453 | B1 | 1/2002 | Scarrott |
| 6,431,168 | B1 | 8/2002 | Rand |
| 6,491,199 | B2 | 12/2002 | Wohlwend |
| 6,547,503 | B1 | 4/2003 | Bohm |
| 6,641,019 | B2 | 11/2003 | Hadfield |
| 6,694,967 | B2 | 2/2004 | Stephen |
| 6,712,255 | B2 | 3/2004 | Dittrich |
| 6,722,550 | B1 | 4/2004 | Ricordi |
| 6,739,490 | B1 | 5/2004 | Shkolnikov |
| 6,783,047 | B2 | 8/2004 | Granacher |
| 6,789,421 | B2 | 9/2004 | Gore |
| 6,796,476 | B2 | 9/2004 | Birk |
| 6,880,738 | B2 | 4/2005 | Neumann |
| 6,983,679 | B2 | 1/2006 | Dittrich |
| 2001/0045892 | A1 | 11/2001 | Thomas |
| 2003/0155397 | A1 | 8/2003 | Neumann |
| 2003/0218042 | A1 | 11/2003 | Odoni |
| 2004/0182907 | A1 | 9/2004 | Dittrich |
| 2004/0211808 | A1 | 10/2004 | Rosenbaum |
| 2004/0211809 | A1 | 10/2004 | Gantner |
| 2004/0215407 | A1 * | 10/2004 | Thielman et al. ............... 702/55 |
| 2005/0000998 | A1 | 1/2005 | Grazioli |
| 2005/0000999 | A1 | 1/2005 | Odoni |
| 2005/0001000 | A1 | 1/2005 | Favre-Bulle |
| 2005/0001002 | A1 | 1/2005 | Schiestl |
| 2005/0252945 | A1 | 11/2005 | Odoni |
| 2006/0071634 | A1 | 4/2006 | Meyer |

* cited by examiner

PROPELLANT HOLDER FOR AN EXPLOSION-DRIVEN SETTING TOOL AND AN EXPLOSION-DRIVEN SETTING TOOL

CROSS-REFERENCE TO RELATED APPLICATIONS

This application is a continuation of pending application Ser. No. 10/830,167, filed on Apr. 22, 2004 now abandoned.

BACKGROUND OF THE INVENTION

1. Field of the Invention

The present invention relates to a propellant holder for an explosion driven setting tool and having a housing with an inner space for receiving the propellant, and to an explosion-driven setting tool including a setting mechanism driven by a propellant, an ignition unit for igniting the propellant, and a receptacle for receiving a propellant holder.

2. Description of the Prior Art

The propellant holder of the type described above can be filled with a powder fuel in form of cartridges or pellets but can also be filled with a fluid or gaseous fuel, with the powder, fluid or gaseous fuel forming the propellant for driving a setting mechanism in a setting tool.

With contemporary setting tools driven with a solid fuel, the cartridges or pellets are carried by a magazine strip which serves as a propellant holder and in which a plurality of pellet charges in blisters or cartridges are arranged. The magazine strips can, thus, be formed as blister or cartridge strips, respectively.

A propellant holder in form of a magazine strip is disclosed, e.g., in U.S. Pat. No. 5,811,717, with ten propellant charges being arranged on the strip. At the height of the penultimate propellant charge, there is provided an indicator mark on the strip. The indicator mark, when it becomes visible in the setting tool, indicates to the user that only one propellant charge remains on the magazine strip. No other information about the propellant charge is available to the user.

In order to insure that a large number of setting processes can be performed with a setting tool without replacement of cartridge, blister, or magazine strips necessary for the setting processes, there is proposed to use magazine strips having an increased length.

U.S. Pat. No. 4,204,473, of which the present invention is an improvement, discloses an explosion-driven setting tool and a cartridge strip therefor having a large number of propellant charges arranged in a box-shaped magazine. The cartridge or magazine strips are arranged in the box in a predetermined position.

The drawbacks of this box-shaped magazine of U.S. Pat. No. 4,204,473 consists in that no information is available to the user about a number of the propellant charges that remains in the box at a predetermined time period.

A propellant holder for fluid and/or gaseous fuel is formed as a pressure container. Such a pressure container, which serves as a propellant holder, are disclosed, e.g., in German Patent DE 197 46 018 C2.

U.S. Pat. No. 6,336,453 discloses an aerosol container with a device having a window in which a number of remaining, in the container, aerosol portions is shown with figures, color codes, or graphic markings. The drawback of the indicator of U.S. Pat. No. 6,336,453 consists in that the data are not visible when the container, e.g., is located in a receptacle of a dispenser. To ascertain as to the number of the remaining aerosol portions, the user has to retract the container from the receptacle, which means loss of time.

Accordingly, an object of the present invention is a propellant holder and a setting tool with the propellant holder in which the drawbacks of the prior art holders and setting tools are eliminated.

Another object of the present invention is to provide a propellant holder and a setting tool with which a number of remaining propellant charges can be easily ascertained.

SUMMARY OF THE INVENTION

These and other objects of the present invention, which will become apparent hereinafter, are achieved by providing a propellant holder of the type described above and including a data storage identification unit in which the propellant supply level data are stored for being read out; and by providing a setting tool including a display for displaying a propellant supply level in the propellant holder, a data communication interface for receiving and transmitting data of the propellant holder, and a data processing unit for receiving the data communicated by the data communication interface and connected with the display for communicating the received data thereto for displaying the display thereby.

The provision of the propellant holder with a data storage identification unit permits to store therein not only the supply level data but also identification data of the propellant. These data advantageously can be easily read out electronically by the setting tool and can become easily available to the user.

The provision of the setting tool with a display, a data communication interface, and a data processing unit connected with both the data communication interface and the display, permits the user to ascertain at any time the propellant supply level in the propellant holder. The retraction of the propellant holder from the setting tool receptacle to ascertain the supply level is not necessary anymore.

According to an advantageous embodiment of the propellant holder, the holder has a data communication interface connected with the data storage identification unit. In the embodiment of an inventive propellant holder, which can be economically produced, the data storage identification unit is formed as EEPROM or as magnetic strip.

In a further, economically produced propellant holder, the data communication interface is formed as an antenna, preferably, as a transponder antenna or as a contact element that cooperates with a mating contact element provided in the receptacle of the setting tool.

The inventive propellant holder can be formed also, e.g., as a pressure can or pressure container for a gaseous and/or liquid fuel. However, the inventive propellant holder can be also formed as a box or a cassette for solid propellant charges in form of a cartridge or blister strip.

According to advantageous embodiment of the setting tool the data processing unit is connected with the ignition device or a device for shifting the same between operational and non-operational modes. In the operation mode of the ignition device, the setting tool can perform a setting process, as in this mode, the propellant is ignited by the ignition device. According to a particular advantageous embodiment of the invention, the data processing unit actuates the ignition device for igniting the propellant when the following conditions are met, namely, (i) the data processing unit has received identification data which were read-out from a data storage identification unit of the propellant holder received in the receptacle of the setting tool and which are recognized by the data processing unit as authorized identification data of a propellant suitable for the setting tool, and the propellant supply level data read-out from the data storage indemnification device and communicated to the data processing unit indicate that the propellant holder is not empty. These embodiment of the setting tool is particularly user-friendly.

In order to reduce the data transmission path between the data communication interfaces, which are provided, respectively, on the holder and the setting tool, to a most possible extent, the data communication interface of the setting tool is located in a region of the propellant holder receptacle. The data communication interface of the setting tool can be formed as antenna or as a transponder antenna, or a mating contact element, or a magnetic strip reader. The data communication interfaces (and other electronic components) of the propellant holder and the setting tool are adapted to each other to form an ideal propellant holder system.

The novel features of the present invention, which are considered as characteristics for the invention, are set forth in the appended claims. The invention itself, however both as to its construction and its mode operation, together with additional advantages and objects thereof, will be best understood from the following detailed description of preferred embodiments when read with reference to the accompanying drawings.

DETAILED DESCRIPTION OF THE PREFERRED EMBODIMENTS

Figure 1:
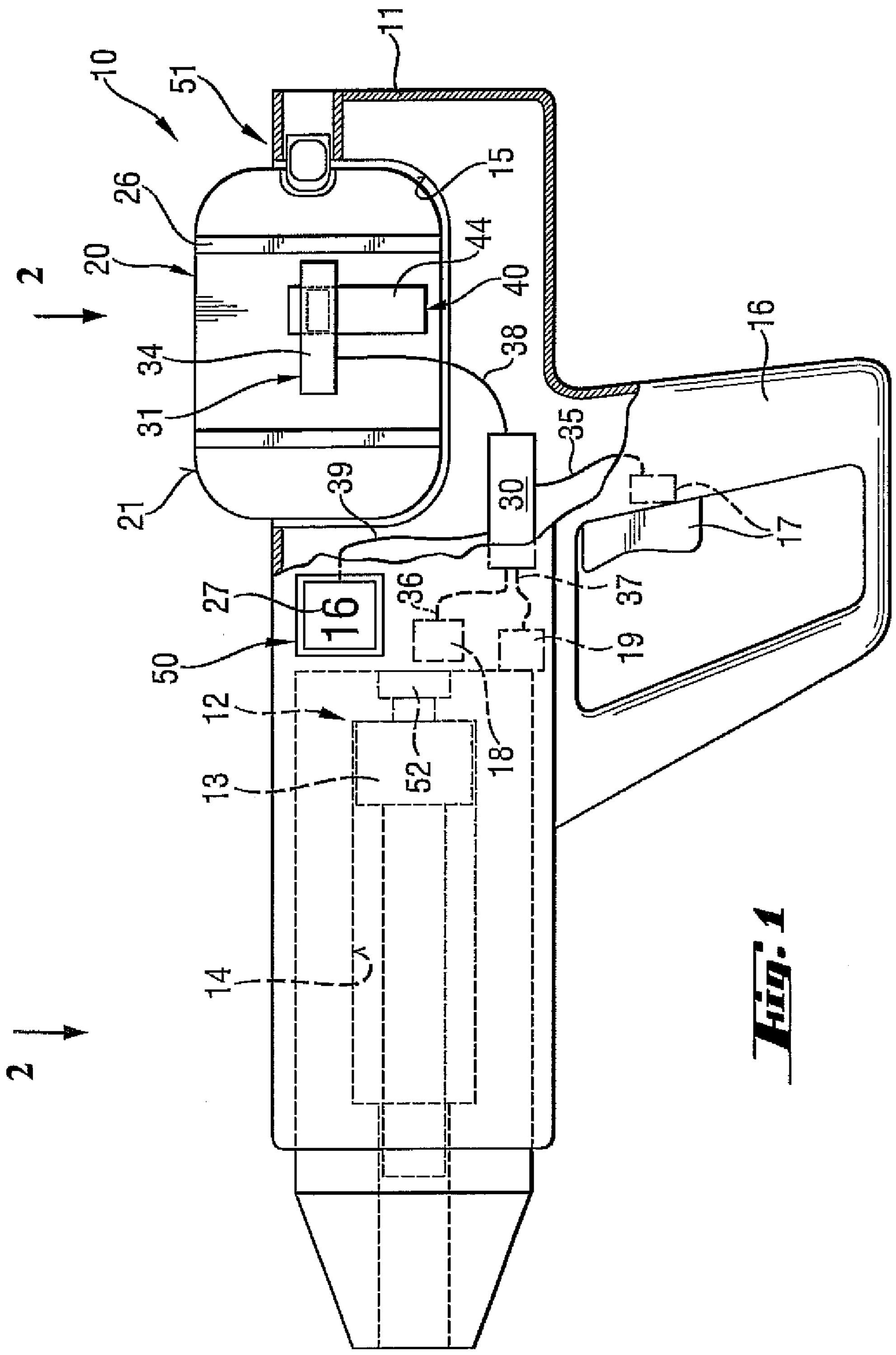
FIG. 1 a schematic, partially cross-sectional view of a setting tool according to the present invention, with a propellant holder received in the setting tool receptacle.
Figure 2:
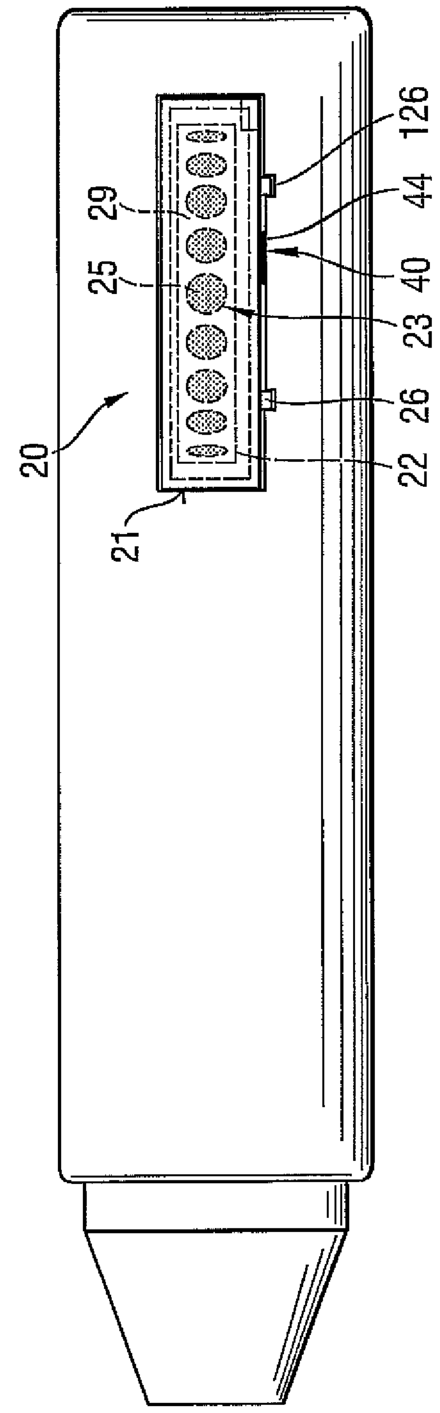
FIG. 2 a top plan view of the propellant holder shown in FIG. 1 along lines 2-2 in FIG. 1.

A first embodiment of a propellant holder 20 according to the present invention, which is shown in FIGS. 1-2, is designed for use in a setting tool 10 schematically shown in FIG. 1. The setting tool 10 has a housing 11 and a setting mechanism 12 located in the housing 11. The setting mechanism 12 includes a piston guide 14, a drive piston 13 displaceable in the piston guide 14, and a cartridge receptacle 52 for receiving a propellant 23 (see FIG. 2), e.g., a solid propellant charge 25 located in a cartridge or a blister. The propellant 23, which is located in the cartridge receptacle 52, can be ignited, electronically or electromechanically, by an ignition device 18. After ignition, the drive piston 13 is driven by expendable explosion gases formed in the cartridge receptacle 52 and performs a setting process, e.g., driving a bolt or a nail, which is located in the bolt guide of the setting tool, into a constructional component (not shown). The setting tool 10 further includes a handle 16 on which an actuation switch 17 is located. The switch 17 is connected by an electrical conductor 35 with a data processing unit 30. The data processing unit 30 transmits, in response to actuation of the switch 17 by the setting tool user, an ignition signal to the ignition device 18 with which the data processing unit 30 is connected by an electrical conductor 36. The setting tool 10 further includes a safety switch 19 which is connected with the data processing unit 30 by an electrical conductor 37. The safety switch 19 generates a signal, which is transmitted to the data processing unit 30, when the setting tool 10 is pressed against a constructional component into which a fastening element is to be driven with the setting tool.

Figure 9:
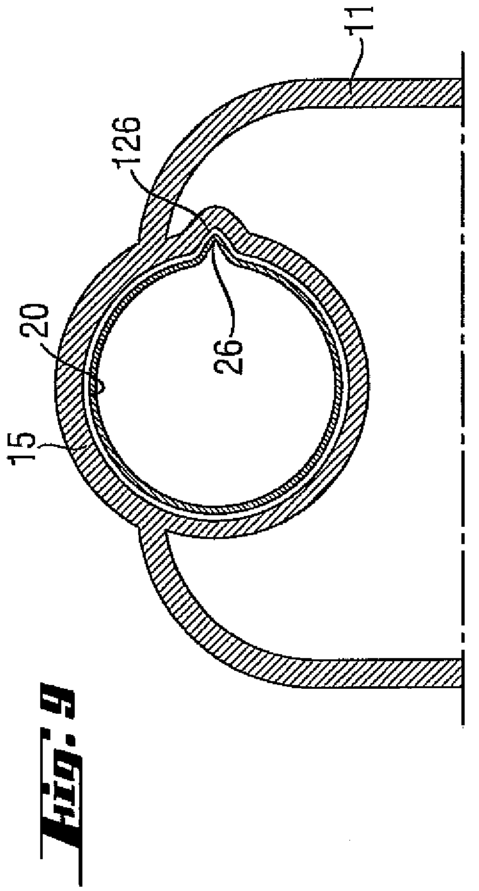
FIG. 9 a cross-sectional view of the propellant holder shown in FIG. 5 along lines 9-9 in FIG. 5.

The setting tool 10 further has a receptacle 15 for receiving the propellant holder 20. The propellant holder 20 is temporary secured in the receptacle 15 with a locking device 51. For securing the propellant holder 20 in the receptacle 15 in a predetermined position, there are provided guide grooves 126, shown in FIGS. 2 and 9, which cooperate with guide elements 26 provided on the propellant holder 20. Retaining of the propellant holder is very important because there is provided, in the region of the receptacle 15, a data communication interface 31 (shown as being suspended) which is formed in the embodiment shown in the drawing as a magnetic strip reader 34. The magnetic strip reader 34 is connected with the data processing unit 30 by an electrical conductor 38 for exchanging data.

On the outer side of the housing 11, there is arranged an optical display 50 which is connected with the data processing unit 30 by an electrical conductor 39. The display 50 displays supply level data 27 indicating the supply level of the propellant holder 20 located in the receptacle 15 of the setting tool 10.

The propellant holder 20, which is shown in FIGS. 1-2, has a housing 21 with an interior space 22 in which propellant 23 in form of solid propellant charges 25, which are arranged in a blister strip 29, are located. On a side wall of the housing 21, there is provided a data storage identification unit 40 in form of a magnetic strip 44. In the data storage identification unit 40, the information about the propellant 23 for providing identification data is stored. The data storage identification unit 40 also contains supply level data 27 indicating a number of solid propellant charges 25 available in the propellant holder 20.

When the propellant holder 20 is received in the receptacle 15 of the setting tool 10, the blister strip with the solid propellant charges 25 is displaced into the setting tool 10, to place a solid propellant charge 25 into the cartridge receptacle 52.

The setting tool 10 and the propellant holder 20 interact in the following way.

After the propellant holder 20 has been inserted in the receptacle 15 of the setting tool 10, the identification data and the propellant supply level are transmitted from the magnetic strip 44 or the data storage identification unit 40 via the data communication interface 31 or the magnetic strip reader 34 to the data processing unit 30.

If the identification data are recognized as acceptable data, and the propellant supply level indicates that at least one solid propellant charge remains in the propellant holder 20, the data processing unit 30, which can be formed, e.g., as a microprocessor or an integrated circuit, puts the setting tool 10 in an operational mode. The propellant supply level 27 is displayed on the display 50. Upon a solid propellant charge 25 being consumed, the data processing unit 30 changes the propellant supply level 27 in the data storage identification unit 40 via the data communication interface 31, so that the data storage identification unit 40 always stores the actual propellant supply level 27.

Upon the last solid propellant charge 25 being consumed, the display 50 displays that no solid propellant charges remain, and the data processing unit 30 puts the setting tool 10 in its non-operational mode.

Figure 3:
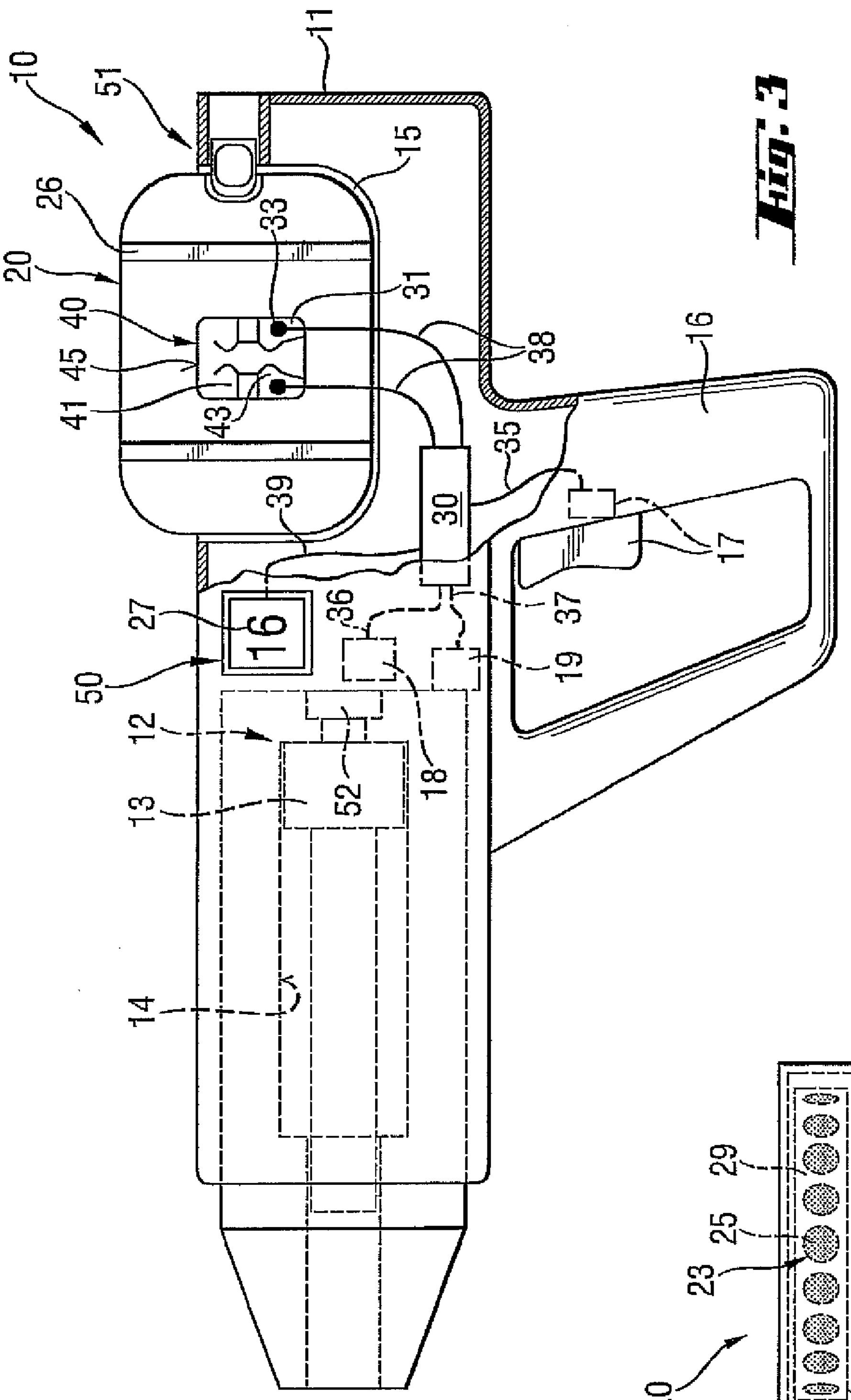
FIG. 3 a schematic, partially cross-sectional view of a setting tool according to the present invention with another embodiment of a propellant holder received in the setting tool receptacle.
Figure 4:
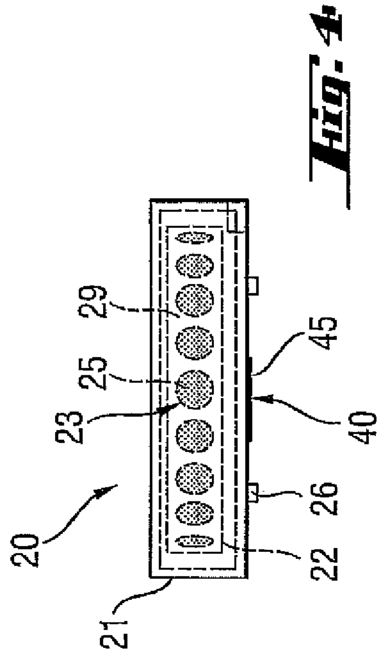
FIG. 4 a plan view of the propellant holder shown in FIG. 3.

FIGS. 3-4 show a further embodiment of a propellant holder 20 according to the present invention, which is inserted in the setting tool 10. The propellant holder 20 shown in FIGS. 3-4 differs from that shown in FIGS. 1-2 in that the data storage identification unit is formed as EEPROM (electronically erasable programmable read-only memory) 45 with an integrated data communication interface 41 in the form of contact elements 43. The setting tool 10, which is shown in FIG. 3, differs from that shown in FIG. 1 in that the data communication interface 31 is formed as mating contact elements 33. All of the other functions and elements are the same as those of the setting tool in FIG. 1.

Figure 5:
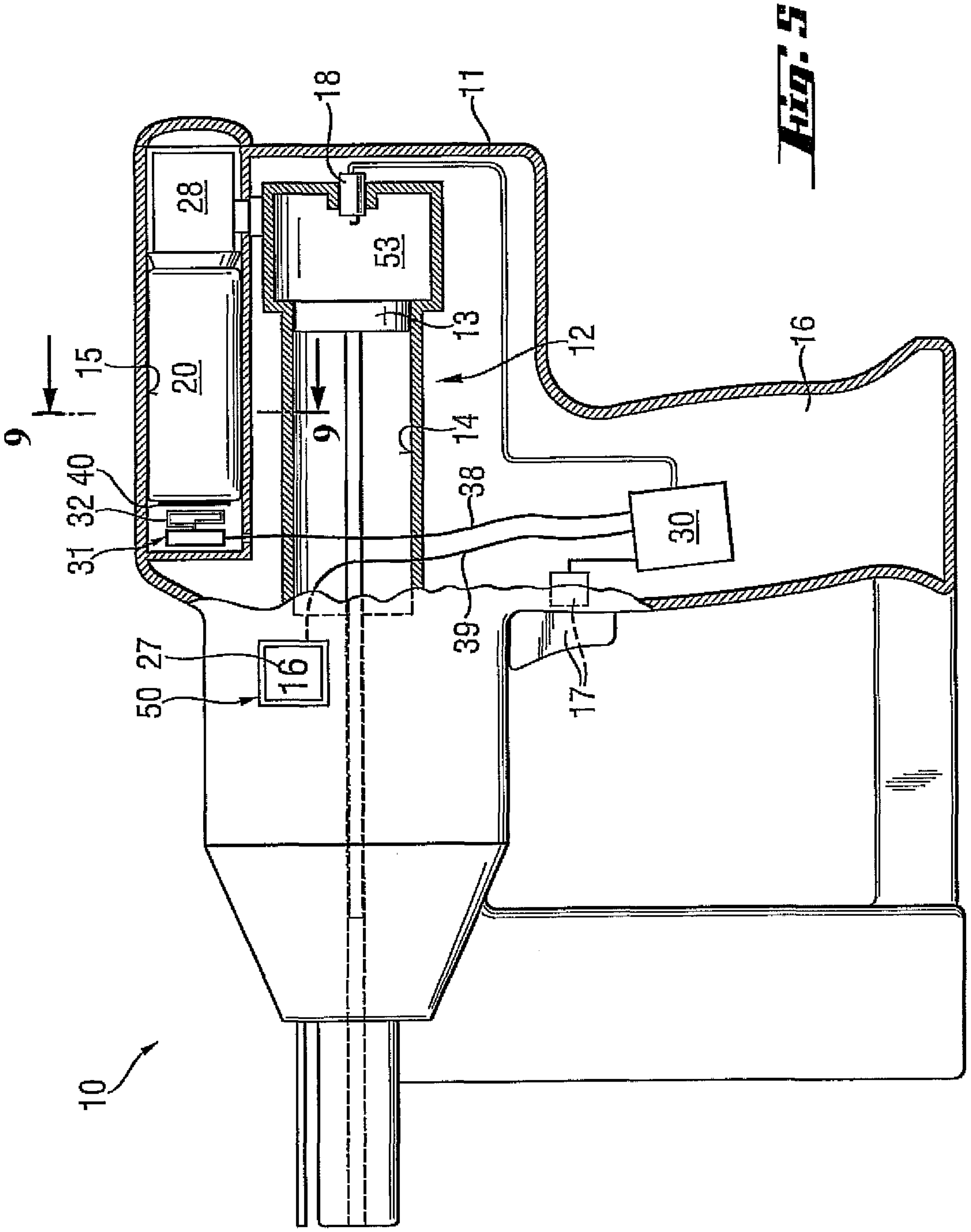
FIG. 5 a schematic, partially cross-sectional view of a setting tool according to the present invention, with a further embodiment of a propellant holder received in the setting tool receptacle.
Figure 8:
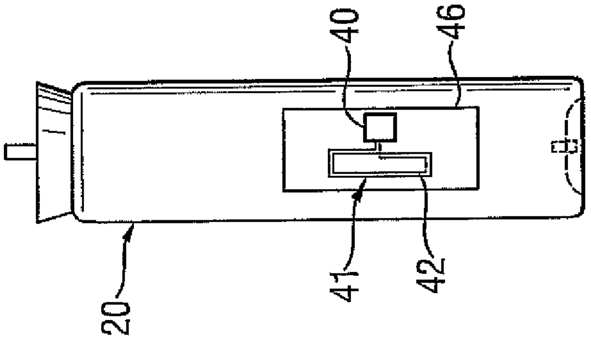
FIG. 8 a side view of a still further embodiment of a propellant holder.
Figure 7:
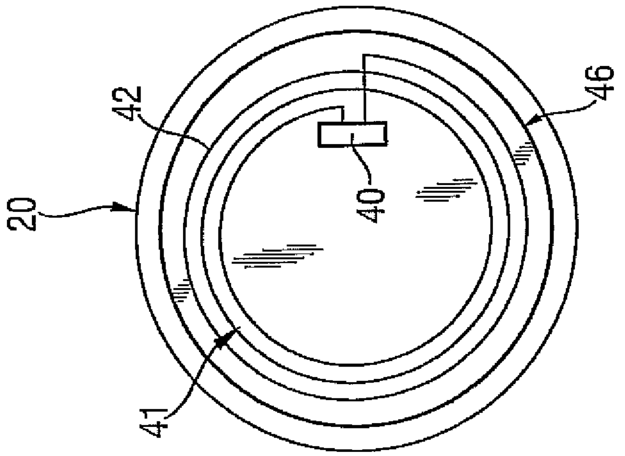
FIG. 7 a bottom plan view of the propellant holder shown in FIG. 6.
Figure 6:
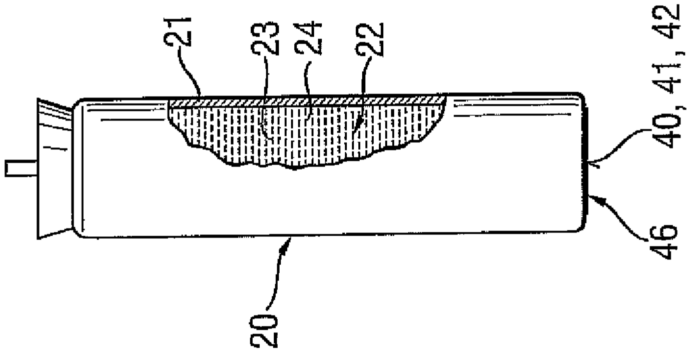
FIG. 6 a side view of the propellant holder shown in FIG. 5.

A still further embodiment of the propellant holder 20 is shown in FIG. 5 with the propellant being a gaseous or liquid fuel 24. The setting tool 10, in which this propellant is used, has, instead of a cartridge receptacle, a combustion chamber 53 that is provided at a rear, with respect to a setting direction, end of the piston guide 14. The propellant, i.e., fuel is fed into the combustion chamber 53 by a metering device 28 provided downstream of the propellant holder 20. The receptacle 15 is formed for receiving a pressure container forming the propellant holder. A detailed description of the propellant holder 20 is given further below with reference to FIGS. 6-8. The data communication interface 31 is formed as a transponder antenna 32 which is connected with data processing unit 30 by an electrical conductor 38.

The pressure container, which formed the propellant holder 20, has a housing 21 with an interior space 22 in which the propellant 23 in form of gaseous or liquid fuel 24 is located. At the bottom of the propellant holder 20, there is provided a transponder tag in form of a carrier element 46 for carrying the transponder antenna 42 forming the data storage identification unit 40 and the data communication interface 41. The carrier element 46 can be formed, e.g., of a plastic film.

The above-described data exchange takes place between the data storage identification unit 40 of the propellant holder 20 and the data processing unit 30 of the setting tool 10 through the data communication interfaces 31, 41. The display 50 displays the remaining amount of the propellant 23, e.g., in ml, cl, or the like or displays an estimated number of remaining fuel portions and a corresponding number of possible settings. In the embodiment of a propellant holder 20 shown in FIG. 8, the transponder tag or the carrier element 46 is provided on the surface of the propellant holder.

The functioning of the setting tool with a holder for fuel propellant is the same as that of FIGS. 1-4.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A propellant holder for being releasably mounted in a setting tool having a receptacle (15) for receiving the propellant holder (20) and a data communication interface (31) provided in a predetermined region of the receptacle (15), the propellant holder comprising:

a housing (21) having an interior space (22) for receiving propellant (23);

a data storage identification unit (40) affixed to the housing (21) and in which an actual propellant supply level (27) is stored to be read-out by the data communication interface (31); and guide means (26) cooperating with respective guide means (126) provided in the predetermined region of the receptacle (15) to enable the data communication interface (31) to read-out the propellant supply level (27) stored in the data storage identification unit (40);

wherein the guide means (126) secures the propellant holder (20) in a predetermined position.

2. The propellant holder of claim 1, wherein the guide means (26) cooperates with the respective guide means (126) provided in the predetermined region of the receptacle (15) for securing the propellant holder (20) in the predetermined position in the predetermined region of the receptacle (15) to enable the data communication interface (31) to read-out the propellant supply level (27) stored in the data storage identification unit (40).

3. An explosion-driven setting tool, comprising:

a setting mechanism (12) driven by a propellant (23);

ignition means (18) for igniting the propellant (23);

a receptacle (15) for receiving a propellant holder (20);

a display (50) for displaying a propellant supply level (27) in the propellant holder (20);

a data communication interface (31) for receiving data from and transmitting data to a data storage identification unit (40) and located in a predetermined region of the receptacle (15), the receptacle (15) having guide means (126) cooperating with guide means (26) of the propellant holder to enable the data communication interface (31) to read-out the propellant supply level (27) stored in the data storage identification unit (40) of the propellant holder (20); and a data processing unit (30) operationally connected with the data communication interface (31) and the display (50);

wherein the guide means (126) secures the propellant holder (20) in a predetermined position.

4. An explosion-driven setting tool, comprising:

a setting mechanism (12) driven by a propellant (23);

ignition means (18) for igniting the propellant (23);

a receptacle (15) for receiving a propellant holder (20), with the propellant holder (2) having a housing (21) with an interior space (22) for receiving propellant (23), and a data storage identification unit (40) in which a propellant supply level (27) is stored for being read-out;

a display (50) for displaying the propellant supply level (27);

a data communication interface (31) for receiving identification data read-out from the data storage identification unit (40) and provided in a predetermined region of the receptacle (15), the receptacle (15) having guide means (126) cooperating with guide means (26) of the propellant holder to enable the data communication interface (31) to read-out the propellant supply level (27) stored in the data storage identification unit (40); and a data processing unit (30) for receiving the identification data from the data communication interface (31) and connected with the display (50) for communicating the propellant supply level (27) thereto;

wherein the guide means (126) secures the propellant holder (20) in a predetermined position.

* * * * *